Figure 1:
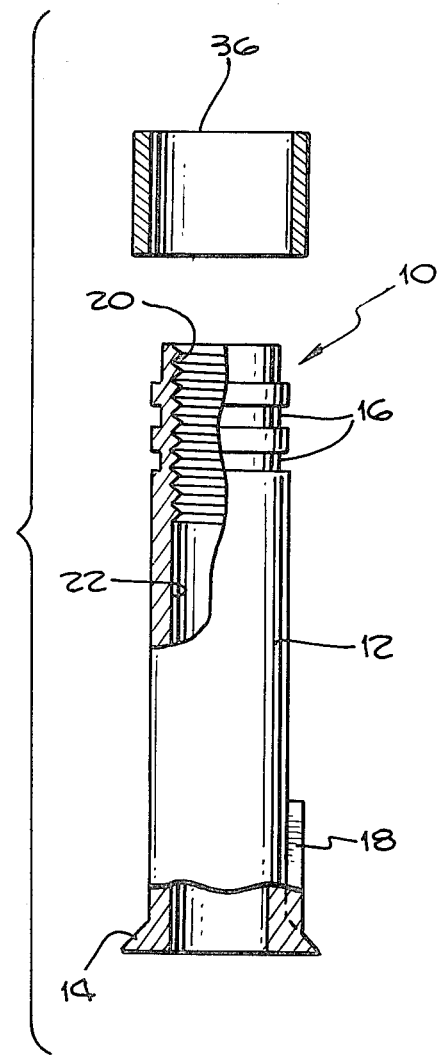

United States Patent [19]

Oliver

[11] Patent Number: 4,475,859
[45] Date of Patent: Oct. 9, 1984

[54] RIVETLESS ANCHOR NUT AND METHOD

[75] Inventor: H. LeRoy Oliver, Culver City, Calif.

[73] Assignee: H & H Oliver Corporation, Inglewood, Calif.

[21] Appl. No.: 295,386

[22] Filed: Aug. 24, 1981

[51] Int. Cl.³ .............................................. F16B 19/05
[52] U.S. Cl. ................................... 411/361; 403/408
[58] Field of Search ................ 72/391, 467; 411/361, 411/360, 176, 180; 403/408, 407

[56] References Cited

U.S. PATENT DOCUMENTS

| D262,863 | 2/1982 | Barnsdale | 411/181 |
|---|---|---|---|
| 1,045,562 | 11/1912 | Kennedy | 411/180 |
| 2,282,851 | 5/1942 | Burke | 411/176 |
| 2,292,239 | 8/1942 | Pierce et al. | 411/176 |
| 3,042,244 | 7/1962 | Van Hecke | 72/391 |
| 3,295,404 | 1/1967 | Baker | 411/361 |
| 3,305,987 | 2/1967 | Weaver | 411/176 |
| 3,454,072 | 7/1969 | Dietlein | 411/176 |
| 3,722,565 | 3/1973 | Miller et al. | 411/180 |
| 4,197,782 | 4/1980 | Champoux | 411/361 |
| 4,325,665 | 4/1982 | Jukes | 411/176 |
| 4,363,581 | 12/1982 | Pease | 411/176 |

FOREIGN PATENT DOCUMENTS

| 2091835 | 8/1982 | United Kingdom | 411/361 |
|---|---|---|---|

Primary Examiner—Andrew V. Kundrat
Attorney, Agent, or Firm—Bruce A. Jagger

[57] ABSTRACT

A rivetless anchor nut having an internally hollow shaft with a head on one end and a broken exterior surface on the other end. A malleable collar is deformed into engagement with the broken exterior surface to lock the shaft in a hole in a workpiece.

3 Claims, 2 Drawing Figures

U.S. Patent  Oct. 9, 1984  4,475,859

RIVETLESS ANCHOR NUT AND METHOD

This invention relates to anchor nuts where the female threaded portion of a nut and screw fastener combination is anchored in place in a workpiece so that only the screw portion of the fastener combination is removable from the workpiece.

Previously, considerable difficulty had been experienced in obtaining satisfactory anchor nuts. Previous expedients included the anchoring of the nut portion of the fastener to a workpiece with rivets or by driving the nut or a portion thereof into the workpiece. These and other prior expedients utilized in the art required considerable time, effort and skill for their installation and generally required modifying the workpiece in some fashion through drilling to accept rivets or through deformation to hold the nut. In highly stressed workpieces, such as in aeronautical applications, the modification of the basic structure was generally considered to be undesirable, but was tolerated because no acceptable alternatives existed.

These and other difficulties of the prior art have been overcome, according to the present invention, wherein a rivetless anchor nut is provided. According to the present invention, the basic structure of the workpiece requires no modification, other than the drilling of a slightly oversized hole where the fastener is to be inserted. The rivetless anchor nut comprises a hollow shaft which is preferably of hardened metal and which is threaded for at least a portion of its length. The hollow shaft is provided with a head at one end, which is adapted to engage one surface of a workpiece to prevent one end of the hollow shaft from passing through the hole in the workpiece. The remote or anchoring end of the hollow shaft is broken on its exterior circumference so as to provide a means of interengaging with a deformable collar. The collar is generally constructed of a malleable metallic material which has a strength of no greater than approximately 125,000 pounds per square inch. The hollow shaft is generally constructed of a high strength metallic material having a strength of approximately 160,000 to 300,000 pounds per square inch. The hollow shaft preferably also possesses high strength properties in shear. The hollow shaft preferably has a generally cylindrical configuration and the collar is generally a short cylindrical section of material and has an inside diameter which is just sufficient to slip over the outside diameter of the broken section of the hollow shaft. The collar is assembled to the shaft by compressing it radially and preferably axially, so as to squeeze it into the broken periphery of the shaft, while at the same time squeezing the workpiece between the headed end of the shaft and the collar. Conventional rivet squeezing or bucking procedures may be utilized to deform the collar. Once deformed in place, the collar anchors the hollow shaft in the hole in the workpiece. The internal thread in the hollow shaft is then available to receive a male threaded member in threaded engagement therwith. Preferably some nonsymmetrical portion of the shaft is provided so as to anchor the hollow shaft against rotation while the threaded male member is being tightened and loosened in the threaded portion of the hollow shaft. Also, the hollow shaft is preferably press fitted into the mounting hole in the workpiece to improve the fatigue shear characteristics. Preferably the threaded portion of the hollow shaft is adjacent to the anchoring end of the shaft where the collor is deformed into engagement with the shaft. In general, the bore through the shaft is not threaded for its entire length, since it is generally intended to be utilized with designs where strength requirements dictate that at least the anchoring end of the hollow shaft have an internal thread therein.

Referring particularly to the drawings for the purpose of illustration only and not limitation, there is illustrated:

FIG. 1, a rivetless anchor nut assembly according to the present invention; and

Figure 2:
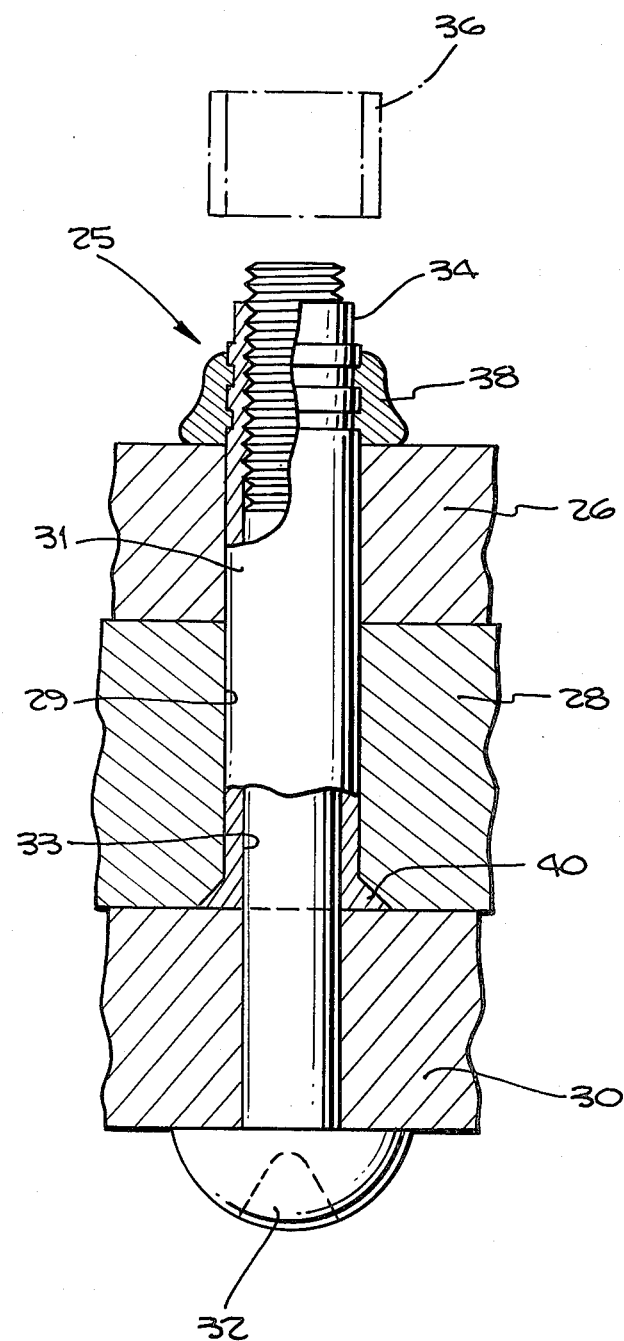

FIG. 2, an additional embodiment of a rivetless anchor nut according to the present invention in its assembled form in cooperation with a workpiece.

Referring particularly to the drawings, there is illustrated in one preferred embodiment a rivetless anchor nut 10, having a hollow, generally cylindrical shaft 12, which is provided at a headed end with a head 14 and at a remote anchoring end with annular grooves 16. An anti-rotational element 18 extends axially along the exterior of shaft 12 for forming and engaging with a groove in the workpiece in which shaft 12 is inserted. The anchoring end of shaft 12 is provided with an internal thread 20. The internal thread 20 is at the remote end of bore 22, which passes through head 14 and, in this embodiment, entirely through the anchoring end of shaft 12. Deformable collar 36 is adapted to be positioned around the anchoring end of shaft 12 surrounding annular grooves 16.

Referring particularly to FIG. 2, there is illustrated an additional embodiment, indicated generally at 25, of a rivetless anchor nut according to the present invention. A workpiece, consisting of a first plate 26 and a second plate 28, is provided with a hole 29 into which shaft 31 is press fitted. Bore 33 extends entirely through shaft 31 and is provided at the anchoring end of shaft 31 with an internal thread. An undeformed collar 36 is slipped over the exterior of anchoring end 34 and is deformed by radial and axial compression to the configuration indicated at 38, wherein it engages the broken surface of the outer circumference of cylindrical shaft 31 and also squeezes the workpiece between itself and headed end 40 of shaft 31. Thus, rivetless anchor nut 25 serves not only to provide a female thread on the workpiece, but also to join first plate 26 to second plate 28. Structural element 30 is mounted in the desired operative position to the workpiece by means of machine screw 32, which is threadably received in the internal thread provided at the anchoring end of bore 33.

The hardened tubular nut of this invention serves the function of a rivet as well as providing high shear fatigue capabilities. The nut is fixed in exact alignment with the bore in the nut so no misalignment problems can occur.

In the more usual configuration the broken exterior surface of the shaft and the female thread are both at the end of the shaft which is remote from the headed end. Either the broken exterior surface or the female thread, or both, may be located intermediate the two ends, if desired. The female thread may extend for the full length of the bore, if desired. The location of the broken exterior surface and the female thread may be adjusted to accommodate variations in the thickness of the workpiece or the structural element or both. For example, a single length of machine screw may be used at a plurality of stations even when the structural element has different thicknesses at the various stations.

What have been described are preferred embodiments in which modifications and changes may be made without departing from the spirit and scope of the accompanying claims.

What is claimed is:

1. A rivetless anchor nut comprising:

an hardened metal elongated hollow shaft member means for receipt in a hole in a workpiece and to extend through said workpiece to a remote side thereof, enlarged means at one end of said shaft member means for preventing said one end of said shaft member means from passing through said hole, a female thread within said shaft member means;

a malleable metal deformable collar element means for encircling said shaft member means on said remote side of said workpiece; and interlocking means on said shaft member means for interlocking with said deformable collar element means.

2. A rivetless anchor nut of claim 1 wherein said interlocking means comprises a groove on the exterior of said shaft member means.

3. A rivetless anchor nut of claim 1, including antirotation means for preventing the rotation of said shaft member means in said hole.

* * * * *